(12) United States Patent
Erlebacher et al.

(10) Patent No.: US 11,746,008 B2
(45) Date of Patent: *Sep. 5, 2023

(54) METHOD OF CARBON DIOXIDE-FREE HYDROGEN PRODUCTION FROM HYDROCARBON DECOMPOSITION OVER METAL SALTS

(71) Applicant: The Johns Hopkins University, Baltimore, MD (US)

(72) Inventors: Jonah Erlebacher, Chevy Chase, MD (US); Bernard Gaskey, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/079,086

(22) PCT Filed: Feb. 22, 2017

(86) PCT No.: PCT/US2017/018910
§ 371 (c)(1),
(2) Date: Aug. 22, 2018

(87) PCT Pub. No.: WO2017/147168
PCT Pub. Date: Aug. 31, 2017

(65) Prior Publication Data
US 2019/0047857 A1    Feb. 14, 2019

Related U.S. Application Data

(63) Continuation of application No. 15/050,318, filed on Feb. 22, 2016, now Pat. No. 9,776,860.

(51) Int. Cl.
C01B 3/34      (2006.01)
C01B 3/06      (2006.01)
(Continued)

(52) U.S. Cl.
CPC ............... *C01B 3/344* (2013.01); *C01B 3/06* (2013.01); *C01B 3/24* (2013.01); *C01G 53/09* (2013.01);
(Continued)

(58) Field of Classification Search
CPC .. C01B 3/344; C01B 3/24; C01B 3/06; C01B 2203/1241; C01B 2203/1235;
(Continued)

(56) References Cited

U.S. PATENT DOCUMENTS

| 3,505,018 A | 4/1970 | Bawa et al. |
| 5,767,165 A * | 6/1998 | Steinberg ................. C01B 3/24 423/453 |

(Continued)

OTHER PUBLICATIONS

International Search Report for PCT/US2017/018910, dated Apr. 28, 2017.

*Primary Examiner* — Steven J Bos
*Assistant Examiner* — Syed T Iqbal
(74) *Attorney, Agent, or Firm* — Fox Rothschild LLP

(57) ABSTRACT

In one aspect, a process to decompose a hydrocarbon such as methane into carbon (graphitic powder) and hydrogen ($H_2$ gas) without secondary production of carbon dioxide, employing a cycle in which a secondary chemical can be recycled and reused, is disclosed.

22 Claims, 1 Drawing Sheet

(51) Int. Cl.
*C01B 3/24* (2006.01)
*C01G 53/09* (2006.01)

(52) U.S. Cl.
CPC ................ *C01B 2203/0272* (2013.01); *C01B 2203/1235* (2013.01); *C01B 2203/1241* (2013.01); *Y02E 60/36* (2013.01); *Y02P 20/141* (2015.11)

(58) Field of Classification Search
CPC ............. C01B 2203/0272; C01G 53/09; Y02P 20/142; Y02E 60/36
See application file for complete search history.

(56) References Cited

U.S. PATENT DOCUMENTS

| | | | |
|---|---|---|---|
| 2004/0265223 | A1 | 12/2004 | Etievant et al. |
| 2008/0307703 | A1* | 12/2008 | Dietenberger ........... C10J 3/463 48/76 |
| 2014/0154170 | A1 | 6/2014 | Hyde et al. |

* cited by examiner

METHOD OF CARBON DIOXIDE-FREE HYDROGEN PRODUCTION FROM HYDROCARBON DECOMPOSITION OVER METAL SALTS

CROSS-REFERENCE TO RELATED APPLICATIONS

The present application is a national stage application filed under 35 U.S.C. § 371, of International Application No. PCT/US2017/018910, filed Feb. 22, 2017, which claims the benefit of U.S. application Ser. No. 15/050,318 filed Feb. 22, 2016, which is incorporated herein by reference in its entirety.

GRANT INFORMATION

This invention was made in part with United States Government support under contract DE-AR0000616 awarded by the Advanced Research Projects Administration—Energy, part of the U.S. Department of Energy. The U.S. Government has certain rights in the invention.

BACKGROUND OF THE INVENTION

Field of the Invention

The presently disclosed subject matter provides a process to decompose hydrocarbons into carbon and hydrogen ($H_2$ gas), employing a cycle in which a secondary chemical is recycled and reused.

Background Information

Over 95% of hydrogen in the United States is produced from natural gas via steam-methane reforming (SMR) [http://energy.govieere/fuelcells/hydrogen-production-natural-gas-reforming], and is used to produce commodity chemicals such as ammonia, the chemical precursor for fertilizer, or is used as fuel. In SMR, natural gas (primarily methane, $CH_4$) reacts with water ($H_2O$) to form hydrogen gas ($H_2$) and carbon monoxide (CO).

$$CH_4 + H_2O \rightarrow CO + 3H_2$$

To increase reaction rates and yields, SMR is typically run at high temperatures and pressures (700-1000° C.) and high pressures (3-25 bar). Product CO is converted to carbon dioxide ($CO_2$) via the water-gas shift reaction, producing more hydrogen:

$$H_2O + CO \rightarrow CO_2 + H_2$$

Production of hydrogen will be improved with new processes that (a) allow production at lower temperatures and pressures, (b) do not produce $CO_2$ as a byproduct of hydrogen production, (c) require smaller energy input, and (d) do not deteriorate over time. The last issue is critical—for example, one process to produce hydrogen is thermal decomposition of methane into solid carbon and hydrogen, which occurs over suitable catalysts at temperatures typically greater than 900° C. Considering just the enthalpy of the chemical reactions involved, direct decomposition has a reaction enthalpy of 74.6 kJ/mol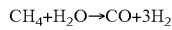, or 37.3 kJ/mol$_{H2}$; this is slightly less heat input than required for steam reforming (41.2 kJ/mol$_{H2}$) and produces no $CO_2$. Direct decomposition, unfortunately, leads to deactivation of the catalyst as it becomes coked with carbon. Furthermore, coking makes the catalyst difficult to recover for reuse.

SUMMARY OF THE INVENTION

In one aspect, the presently disclosed subject matter provides a process to decompose hydrocarbons into carbon and hydrogen ($H_2$ gas), employing a catalyst-free cycle in which a secondary chemical is recycled and reused. In a preferred embodiment of the process, the secondary chemical suitably is primarily composed of anhydrous nickel chloride ($NiCl_2$). Other metal halides can also be suitable.

In one preferred aspect, first, hydrocarbons are input into the cycle and decomposed to carbon in a chemical reaction with nickel chloride at elevated temperatures in a dry and oxygen-free atmosphere to produce hydrogen chloride gas, nickel metal, and carbon. Then, these components are cooled until the hydrogen chloride gas reacts with nickel metal to reform anhydrous $NiCl_2$ and hydrogen gas. The hydrogen gas is then collected as the reaction product. Carbon and $NiCl_2$ in the reaction chamber are separated by sublimating the $NiCl_2$ at temperatures near 1000° C., at which point the cycle can be run again. Carbon formed from this cycle can be removed from the reactor at any point.

Thermodynamic analysis of the process predicts a net heat input for the chemical reactions in the entire cycle of 37.3 kJ/mol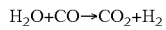 when the input hydrocarbon is methane. In the preferred embodiment, the process is operated at ambient pressures and at temperatures below that required for SMR or direct methane decomposition; the process can be repeated without deactivation of the secondary chemical; and the process produces no carbon dioxide from the feedstock.

Certain aspects of the presently disclosed subject matter having been stated hereinabove, which are addressed in whole or in part by the presently disclosed subject matter, other aspects will become evident as the description proceeds when taken in connection with the accompanying Examples and Figures as best described herein below.

BRIEF DESCRIPTION OF THE FIGURES

Figure 1:
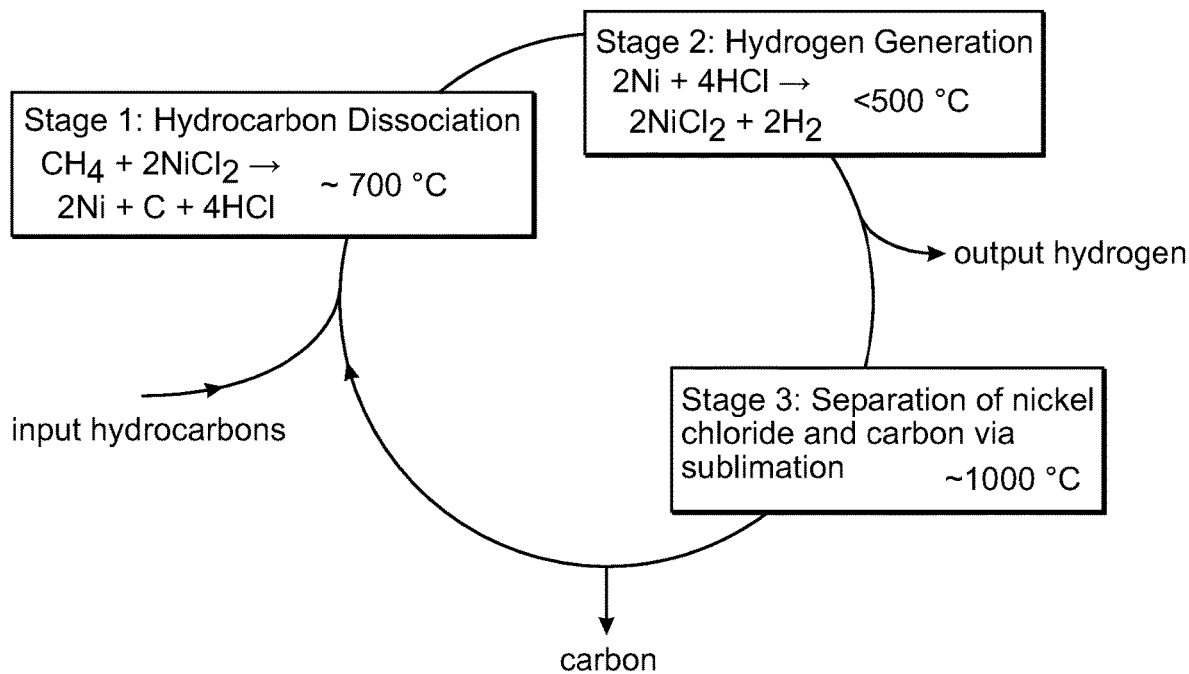
Figure 2:
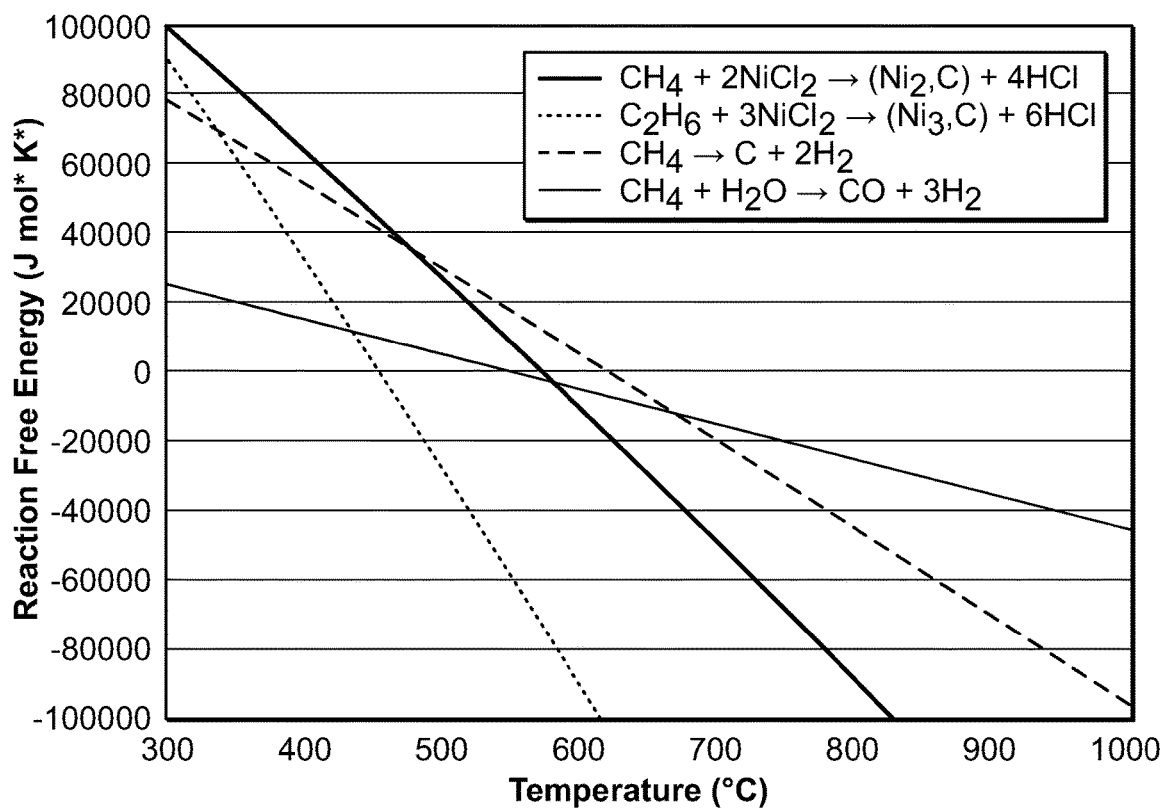

Having thus described the presently disclosed subject matter in general terms, reference will now be made to the accompanying Figures, which are not necessarily drawn to scale, and wherein:

FIG. 1 is a schematic representation of the chemical reaction steps in the presently disclosed method for producing hydrogen without carbon dioxide using reactants and chemical intermediates associated with a particular embodiment;

FIG. 2 shows the reaction free energy of different chemical reactions associated with hydrocarbon reforming: (a) steam methane reforming, (b) thermal decomposition of methane, (c) methane decomposition via reaction with nickel chloride, and (d) ethane decomposition via reaction with nickel chloride.

DETAILED DESCRIPTION OF THE INVENTION

The presently disclosed subject matter now will be described more fully with reference to the accompanying Figures, in which some, but not all embodiments of the presently disclosed subject matter are shown. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

It will be obvious to practitioners familiar with the art that values for the energy required for chemical reactions described herein may be expressed as $kJ/mol_{CH4}$ when referring to the energy per input methane molecule, or $kJ/mol_{H2}$ when referring to the energy per output hydrogen molecule.

In some embodiments, the presently disclosed subject matter provides methods for transforming hydrocarbons (molecules comprised primarily of carbon and hydrogen atoms) to elemental carbon and hydrogen molecules ($H_2$).

In one preferred aspect, we provide a process which comprises reacting a hydrocarbon and a metal salt to produce a hydrogen-containing gaseous product and a solid product.

In another aspect, we provide a process comprising 1) a first chemical reaction between a hydrocarbon and a metal salt producing a hydrogen-containing gaseous product and solid products, and 2) a second chemical reaction in which the hydrogen-containing gaseous product and at least a portion the solid products further react to re-form the original metal salt and hydrogen gas.

In these methods, a variety of metal salts can be employed including metal salts comprising zinc, calcium, magnesium, manganese, molybdenum, cobalt and/or nickel. Metal halide salts are often preferred, including chloride salts. Anhydrous metal salts also may be preferred.

Suitably, the solid product will comprise carbon and metal of the metal salt. In certain aspects, the hydrogen-containing gaseous product is a gaseous acid.

In a preferred aspect, the present methods include use of a molten salt composition as a reaction medium. For example, a metal salt such as nickel salt can be admixed in a solvent that comprises a molten salt. Exemplary preferred molten salt solvents may comprise lithium chloride and/or potassium chloride for example in a mixture comprising lithium chloride and potassium chloride at their eutectic composition. A hydrocarbon can be admixed with the molten salt composition, for instance bubbling methane or other hydrocarbon through the molten salt composition. We have found such reaction effectively produces carbon, including where carbon can float to the top of the molten salt solvent composition.

The cycle to produce hydrogen is schematically illustrated in FIG. 1, which lists the chemical reactions in the cycle, and their relative order. We arbitrarily assign Stage 1 of the process as that step in which a reactant stream of hydrocarbons are introduced into a reaction chamber containing anhydrous nickel chloride ($NiCl_2$); the atmosphere of the chamber does not contain oxygen nor water. If the particular hydrocarbon is methane, the following reaction occurs under these conditions at temperatures preferably above 600° C., and most preferably above 650° C.:

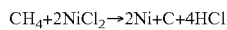

By 2Ni+C is meant a reactant product comprised of nickel metal (Ni) and carbon (C) in the stoichiometric ratio of 2:1. FIG. 2 shows the Gibbs reaction free energy for this reaction and other reactions referenced herein as a function of temperature, calculated from thermodynamic property values freely available in databases maintained by the National Institutes of Standards and Technology (NIST). It is a well-known chemical principle that if the Gibbs reaction free energy drops below zero for a particular chemical reaction, the chemical reaction becomes favorable to proceed. In the general case of methane reacting with a chloride salt, one molecule of hydrogen chloride gas (HCl) is created for each hydrogen atom in the input hydrocarbon stream. As long as the ratio of hydrogen to carbon in the input stream is greater than unity, there will be a positive reaction entropy, and thus a temperature at which the reaction free energy will drop below zero. In the specific case of methane reacting with nickel chloride, the Gibbs reaction free energy becomes negative near 570° C. In the case of ethane ($C_2H_6$) reacting with nickel chloride, the Gibbs reaction free energy drops below zero near 455° C.

It is possible that hydrocarbons containing one or more C—C bonds will be difficult to dissociate due to slow reaction kinetics, and that catalysts suitable for cracking alkanes, such as the zeolite HZSM-5 [F. C. Jentoft, B. C. Gates, "Solid-acid-catalyzed alkane cracking mechanisms: evidence from reactions of small probe molecules," Topics in Catalysis, 4 (1997), 1-13], may be required to lower the activation barrier for these reactions. In the specific embodiment of methane decomposition, no catalyst is required to produce hydrogen.

In a preferred embodiment of this process, nickel chloride is chosen to react with hydrocarbons, because the temperature at which reaction is predicted to proceed between 500 and 1000° C., more preferably between 600 and 800° C., and most preferably at 675° C. (below the temperatures at which steam reforming or direct methane decomposition are typically performed). However, any anhydrous metal halide salt can be used in this reaction, as long as more than one hydrogen halide molecule is produced per molecule of hydrocarbon molecule input. In the examples, chloride is preferred, but other halides will work. Other metals such as Mn, Cu, Zn, Ca, Mo, and Mg may also work.

Stage 1 of the process produces dehydrogenated carbon, nickel metal, and hydrogen chloride gas, in a ratio dictated by the chemical reaction stoichiometry. For instance, in the decomposition of methane, two nickel atoms of nickel metal, and four hydrogen chloride molecules are produced for each carbon atom from one methane molecule.

In Stage 2 of the process, nickel, carbon, and hydrogen chloride gas are cooled to temperatures below ~550° C. Below this temperature, nickel metal spontaneously reacts with HCl according to the chemical reaction.

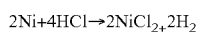

(The stoichiometric coefficients of this equation have been adjusted to reflect that 2 hydrogen molecules are formed for each molecule of methane input into Stage 1 of the process.) When the system is cooled to below ~550° C., nickel metal will be transformed back to nickel chloride via reaction with HCl. Carbon in the system is a spectator species to this chemical reaction. After the reaction is run to completion, hydrogen gas is removed from the reactor as the final reaction product.

At this stage, the cycle may be repeated. However, in certain embodiments, a Stage 3 may be added to the cycle where it of interest to separate the carbon from the nickel chloride as a second reaction product. In a preferred embodiment, nickel chloride is sublimed at 1000° C., and condensed away from the carbon, which can then be physically removed from the system. Other methods of separation will be known to those familiar with the art of chemical separations.

The following examples are intended to illustrate but not limit the invention.

EXAMPLES

The following Example is included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The synthetic descriptions and specific examples that follow are only intended for the purposes of illustration, and are not to be construed as limiting in any manner to make compounds of the disclosure by other methods.

Example 1

10 g of anhydrous $NiCl_2$ was loaded into an alumina tube and placed in a tube furnace. A flow of 100% argon (Ar) gas was passed through the tube, and bubbled through a water beaker to create a non-oxygen containing atmosphere within the tube. A mass spectrometer connected to the gas stream between the tube and the bubbler sampled and measured the composition of the tube outlet stream. The sample in the tube furnace was heated to 700° C., and then the inlet stream composition was switched to 95% argon, 5% methane. Immediately, a hydrogen chloride signal was observed in the mass spectrometer, and the reaction was run until the hydrogen chloride signal dropped to zero. The gas inlet stream was then switched back to 100% Ar and the tube was cooled. It was found that the nickel chloride had been transformed to a black powder that elemental analysis confirmed was comprised of nickel and carbon. According to the chemical reactions described for each stage of the process, the reaction should yield 0.46 g of carbon. The powder was dissolved in hydrochloric acid solution, and the carbon filtered, rinsed, and dried; 0.49 g of carbon was collected, which is equivalent to the expected yield within the experimental error of the system. Hydrogen was generated during the dissolution of the powder in hydrochloric acid; the expected quantity produced was too small to assay.

REFERENCES

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

Although the invention has been described with reference to the above example, it will be understood that modifications and variations are encompassed within the spirit and scope of the invention. Accordingly, the invention is limited only by the following claims.

What is Claimed is:

1. A process for producing hydrogen, comprising:
reacting a hydrocarbon and a metal salt to produce a hydrogen-containing gaseous product and a solid product that comprises carbon; and
wherein the hydrogen-containing gaseous product and solid product react to produce the metal salt and hydrogen gas.

2. The process of claim 1, wherein the solid product comprises carbon and the metal of the metal salt.

3. The process of claim 1, wherein the hydrogen-containing gaseous product is a gaseous acid.

4. The process of claim 3, wherein the gaseous acid is captured by reaction with a metal of the solid product.

5. The process of claim 4, wherein the gaseous acid is first captured by a liquid solvent prior to reaction with a metal salt of the solid product.

6. The process of claim 5, wherein the liquid solvent is selected from the group consisting of water, sulfur dioxide and ethanol.

7. The process of claim 3, wherein the solid product comprises a metal of the metal salts and the metal reacts with the gaseous acid to re-form the metal salt.

8. The process of claim 1, wherein reacting metal with the hydrogen-containing gaseous product produces diatomic hydrogen gas, which is captured as a product.

9. The process of claim 1, wherein the hydrocarbon is selected from the group consisting of methane, ethane, and a hydrocarbon species with more than 2 carbons, or a mixture of these.

10. The process of claim 1, wherein the metal salt is a metal halide.

11. The process of claim 10, wherein the metal salt is anhydrous.

12. The process of claim 10, wherein the halide is chloride.

13. The process of claim 1, wherein the metal salt comprises a metal selected from the group consisting of zinc, calcium, magnesium, manganese, cobalt and nickel.

14. The process of claim 1, wherein the metal salt comprises molybdenum.

15. The process of claim 1, wherein the hydrocarbon and metal salt are reacted in a solvent comprising a molten salt composition.

16. The process of claim 1, wherein the metal salt is recycled.

17. The process of claim 1, wherein the metal salt comprises nickel.

18. The process of claim 1, wherein the hydrogen-containing gaseous product is a hydrogen halide.

19. The process of claim 1, wherein the hydrogen-containing gaseous product undergoes additional simultaneous reaction to produce a secondary hydrogen-containing product.

20. The process of claim 1, wherein the temperature of the reaction is in the range from 575° C. to 1000° C.

21. A process for producing hydrogen, comprising:
reacting methane or ethane and a metal salt to produce a hydrogen-containing gaseous product and a solid product,
wherein the hydrogen-containing gaseous product and solid product react to produce the metal salt and hydrogen gas, wherein the metal salt is a metal halide in which the metal comprises zinc, calcium, magnesium, manganese, cobalt or nickel.

22. The process of claim 21 wherein the halide salt is a chloride salt.

\* \* \* \* \*